Figure 1:
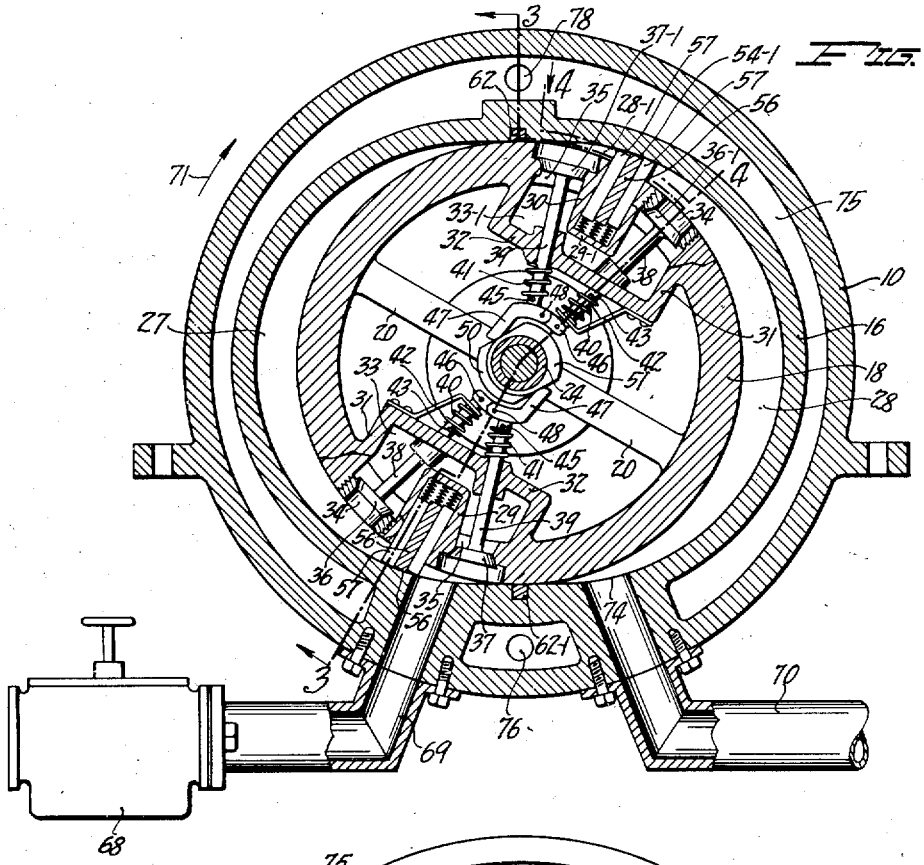

July 29, 1930. F. M. NEWSON Re. 17,749

INTERNAL COMBUSTION ENGINE

Original Filed Jan. 13, 1926 2 Sheets-Sheet 1

Inventor
F. M. NEWSON,
By R. Mellinckrodt.
Attorney

INTERNAL COMBUSTION ENGINE

Original Filed Jan. 13, 1926 2 Sheets-Sheet 2

Inventor
F. M. NEWSON,

By R. Mallinckrodt.
Attorney

Reissued July 29, 1930 Re. 17,749

UNITED STATES PATENT OFFICE

FREDERICK M. NEWSON, OF SALT LAKE CITY, UTAH, ASSIGNOR TO NEWSON TURBINE MOTOR COMPANY, OF SALT LAKE CITY, UTAH, A CORPORATION OF UTAH

INTERNAL-COMBUSTION ENGINE

Original No. 1,637,958, dated August 2, 1927, Serial No. 81,050, filed January 13, 1926. Application for reissue filed May 13, 1929. Serial No. 362,819.

This invention relates to an internal combustion engine and more particularly a rotary internal combustion engine. The principal object of the invention is to provide efficient and economical means to obtain in usable form, as large a percentage as possible of the potential energy of explosive fuel.

To this end I employ a casing of elongated form with a rotor operatively mounted therein, said rotor having pistons movable alternately through an inhaling-compression chamber or cylinder and through an expansion-exhausting chamber or cylinder. In the rotor is an explosion-transfer chamber, which receives an explosive fluid charge from the compression cylinder. This charge is ignited and exploded and then transferred to the expansion cylinder wherein the exploded fuel exerts its energy expansively, and is finally discharged after its motive force is exerted upon a piston.

The features of this invention for which the protection of Letters Patent is desired, are collectively grouped in the claims concluding this specification.

Figure 2:
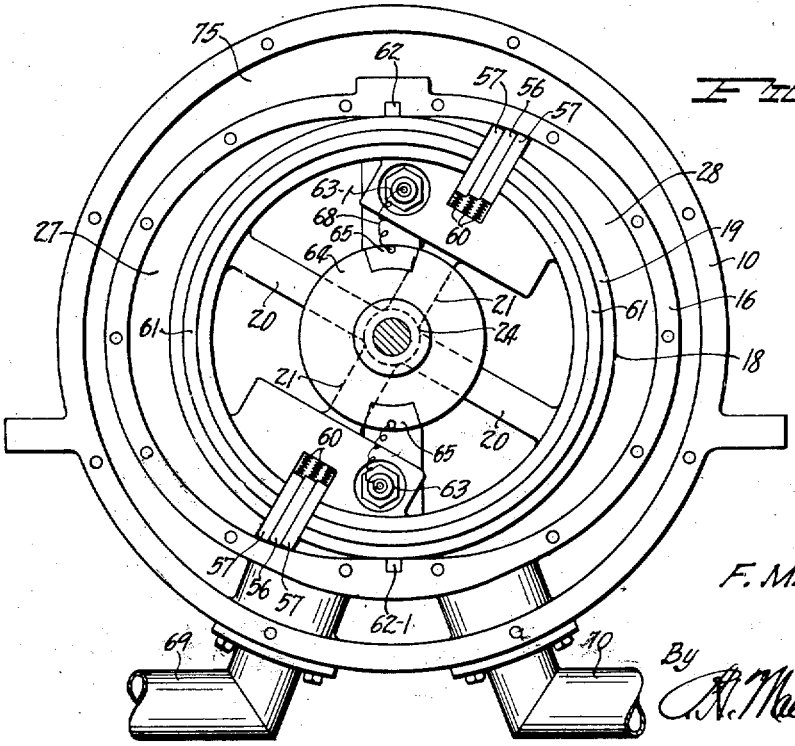
Figure 4:
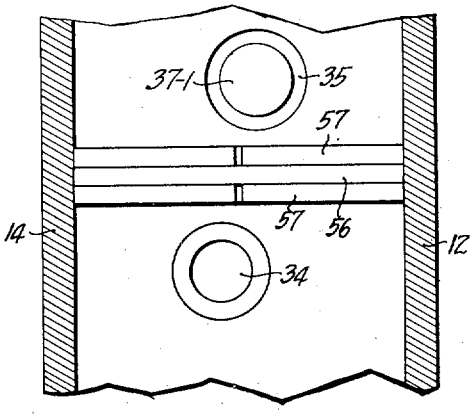
Figure 3:
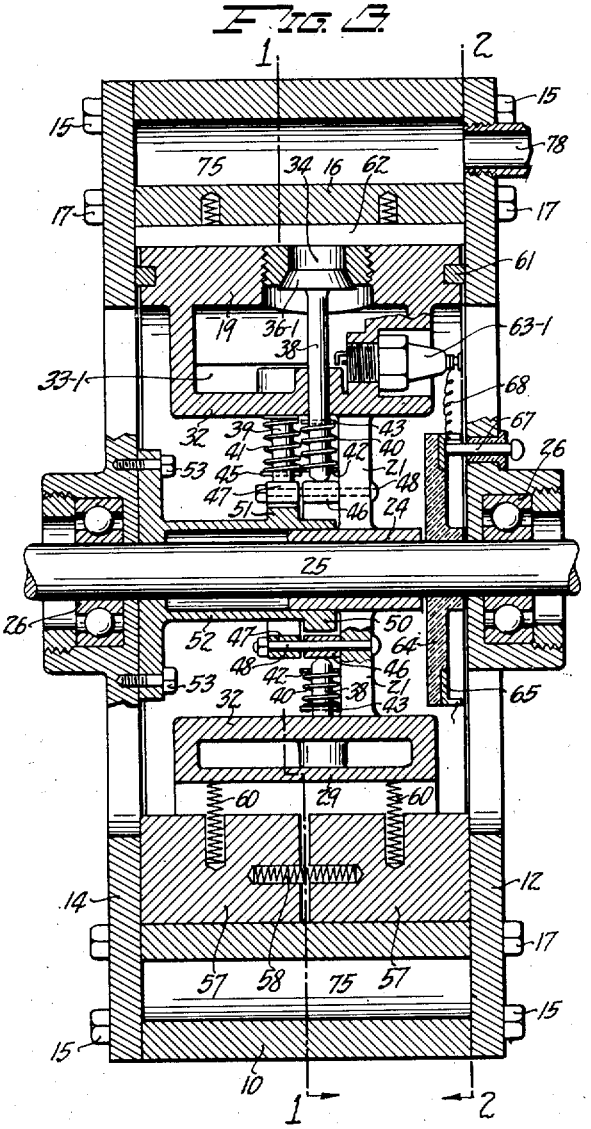
Figure 5:
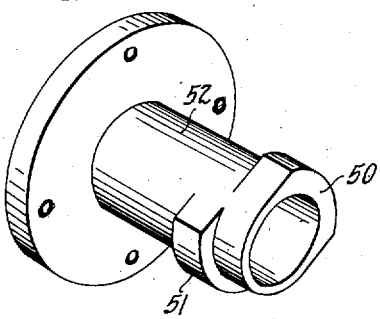

In the drawings, which illustrate one embodiment of this invention,

Fig. 1 represents a longitudinal vertical section taken principally on line 1—1 in Fig. 3;

Fig. 2, a side elevation taken substantially along the line 2—2 in Fig. 3 and reflected from a mirror plane, the head of the casing being removed;

Fig. 3, a cross section taken principally along line 3—3 in Fig. 1;

Fig. 4, a fragmentary elevation of the rotor, substantially along line 4—4 in Fig. 1; and Fig. 5, a view in perspective of the cam sleeve individually.

Referring to the drawing, the numeral 10 indicates an outer cylindrical shell against which end heads such as 12 and 14 may be fastened, for instance by means of bolts 15. Spaced inwardly from the shell 10 is a second or inner cylindrical shell 16 which may be held substantially fluid-tight between the heads 12 and 14 by means of bolts 17. This second cylindrical shell has two principal axial planes, a major and a minor, and is elongated along the major plane.

The elements of generation of the cylindrical shells may be substantially parallel to one another and to the major and minor axial planes. Within the inner shell and substantially tangent thereto along these elements of generation, which lie in the minor axial plane, is the rotor 18. This rotor includes the rim 19 supported directly by the spokes or arms 20 and indirectly by the spokes or arms 21, both sets of arms being carried on a hub 24, which in turn is rigidly mounted on the shaft 25, supported in suitable journals, such as ball bearings 26. Thus mounted, the inner shell 16 and the rim 19 define between them a plurality, usually two, of chambers or cylinders such as 27 and 28, each of these cylinders in cross-section having preferably the shape of a crescent.

The shells 10 and 16, together with the heads 12 and 14, form substantially a casing within which the operation of the rotor takes place.

Extending inwardly from the rim 19 and forming piston housings, are walls 29 and 30. Also extending inwardly from the rim 19 and spaced apart from the walls 29 and 30 respectively so as to extend partly around the latter, are walls 31 and 32, which in association with the various other walls shown, define explosion chambers 33 and 33—1 within the rotor. Leading into the explosion chambers are inlet ports 34, and leading out therefrom, are the outlet ports 35. Positioned to control passage through the ports 34, are the inlet valves 36 and 36—1 carried on stems 38; and positioned to control passage through the ports 35, are the outlet valves 37 and 37—1 carried on stems 39.

The valve stems 38 and 39 are slidable in guides formed in the walls 32 of the explosion chambers, and are acted upon by the compression springs 40 and 41, respectively, to close the valves. The springs 40 exert their force against the abutment member 42 and against the pins 43 secured in the stem 38, while the springs 41 exert their force against the walls 32 and against the pins 45 secured in the stems 39. It will be clear that the valves 36 open inwardly and the valves 37 outwardly, with respect to the rotor.

In order to open the valves at the proper times during the travel of the rotor, lifters 46 and 47 are provided, the former having extremities pivoted to the stem 38, and the latter bearing against the ends of stem 39, both the lifters 46 and 47 being pivotally mounted on the pins 48, which may be secured in the arms 21 of the rotor.

The operation of the lifters to open the respective valves is effected positively by means of the cams 50 and 51, the former engaging the lifters 46 and the latter the lifters 47. The cams 50 and 51 may form integral parts of a stationary sleeve 52 which may be secured to the casing head 14 by screws 53. The hub 24 rotates freely within the sleeve 52.

Between the inlet valves and the related outlet valves, are located piston housings, such as 29 and 29—1, associated with the walls of the corresponding explosion chambers. The inlet valves are located in advance of the corresponding piston housings and the outlet valves in the rear of these piston housings.

In the piston housings are pistons 54 and 54—1, these being slidably disposed to move in and out substantially radially with reference to the rotor axis. Each piston is preferably made up of a plurality of separate blades nested together, some of the blades, such as 56, being made in one piece, and others, such as 57, being made in two pieces urged apart by the compression springs 58. The lateral faces of the blades 57 ride against the inner surfaces of the end heads, making substantially fluid-tight contacts therewith. In the side faces of the rim, between the pistons, are arcuate packing pieces 61 which also ride against the end heads.

The piston blades are forced radially outwardly by compression springs 60, thus causing the end faces of the blades to closely contact the inner peripheral surface of the shell 16. Packing strips 62 and 62—1 are disposed in the shell 16, preferably along the minor axial plane of the shell 16, these packing pieces being operative to form a close contact along the peripheral outer surface of the rotor.

Spark plugs 63 and 63—1 are provided in the walls of the explosion chambers 33 and 33—1 respectively, these spark plugs forming part of an ignition system which may include a fiber disk 64 fixed on the shaft and having electro-conductive contact pieces 65 fastened thereto, these contact pieces being arranged to intermittently receive electricity through a brush 67. The contact pieces have electrical connections as at 68, whereby the spark plugs will be caused to function in timed sequence with the travel of the rotor.

A carburetor 68 is provided for supplying a combustible fuel mixture through the supply pipe 69, to the cylinder 27 which acts in an inhaling and compressing capacity.

An exhaust pipe 70 is in communication with the cylinder 28 which acts in an expanding and exhausting capacity.

As a matter of convenience, the walls 31 of the explosion chambers may be called "transverse walls" while the walls 32 joining the transverse walls, may be called "chord walls". In order to provide for the proper working of the cams and lifters, the cord walls, which have in general been previously described herein, are spaced a reasonable distance apart from the rotor axis, in other words, are located intermediate the rim and the axis of rotation.

In operation, the rotor travels in the direction indicated by the arrow 71 causing the pistons to sweep through the cylinders 27 and 28. The sweeping of a piston, for instance 54, through the cylinder 27 draws into that cylinder and back of the piston, a charge of the combustible mixture from the carburetor, while simultaneously it compresses in front, a charge of the combustible mixture just previously taken in by the piston ahead. As the charge in front of piston 54 is being compressed, it is caused to flow into the explosion chamber 33. Substantially the entire compressed charge will have entered the said explosion chamber at the time that the valve passes just under the packing strip 62.

At the time of passing under the packing strip 62, the corresponding lifter will descend along the receding cam, thus allowing the inlet valve 36 to close. Soon after, the related outlet valve 37 passes from under the packing strip 62 to the relative position occupied at present by the outlet valve 37—1. At about this time, the mixture in the explosion chamber will be ignited to cause the explosion of the mixture, and immediately afterward the proper cam will begin to act against the corresponding lifter, thus causing the outlet valve to be raised from its seat, and allowing the exploded charge to enter the space 28—1 of the cylinder 28. By its expansive force this charge acts upon the piston 54, which now is supposed to be occupying the position of piston 54—1, and an impulse is exerted effective to cause the travel of the rotor.

When the piston 54 passes the exhaust port 74, the spent charge will begin exhausting through the port 74, and will be swept in entirety out of the cylinder 28 by the piston 54—1.

This operating cycle will be repeated alternately and indefinitely by the two pistons.

The engine is cooled by water or other liquid circulating through the space 75, the water entering by either of the ports 76 or 78, and leaving by the other.

I am aware that it is not broadly new to provide an elongated casing with a rotor operably mounted therein to form cylinders, nor to provide pistons slidable in the rotor and arranged to sweep through the said cylinders. But, so far as I know, it is essentially novel to associate with such a combination, those elements relating to the explosion and transfer chambers and the valve mechanism connected therewith, as hereinbefore described.

While a specific embodiment of this invention is herein shown and described, it is to be clearly understood that variations within the scope of the accompanying claims, may be resorted to without jeopardizing my patent protection.

What I claim is:

1. An internal combustion engine comprising a casing, a rotor operable in said casing, said rotor and casing defining a compression chamber and an expansion chamber, piston housings in said rotor, pistons operably disposed in said housings so as to function in both said chambers, means associated with said housings to define explosion chambers, means defining ports to afford communication between said explosion chambers and said compression chamber and between said explosion chambers and said expansion chamber, and valves controlling passage through said ports.

2. An internal combustion engine, comprising a casing, a rotor operable therein, said rotor and casing defining a compression chamber and an expansion chamber, piston housings in said rotor, pistons in said housings so as to function in both said chambers, means associated with said housings to define explosion chambers. means defining ports to afford communication between said explosion chambers and said compression chamber and between said explosion chambers and said expansion chamber, valves controlling passage through said ports, springs actuating said valves, and means actuating said valves contrary to the urge of said springs, in timed relation to the movement of said rotor.

3. An internal combustion engine, comprising a casing, a rotor operable therein, said rotor and casing defining a compression chamber and an expansion chamber, piston housings in said rotor, pistons in said housings so as to function in both said chambers, means associated with said housings to define explosion chambers, means defining ports to afford communication between said explosion chambers and said compression chamber and between said explosion chambers and said expansion chamber, valves controlling passage through said ports, springs effective to close said valves, and means effective to open said valves in opposition to the pressure of said springs and in timed relation to the travel of said rotor.

4. An internal combution engine, comprising a casing, a rotor operable therein, said rotor and casing defining a compression chamber and an expansion chamber, piston housings in said rotor, pistons in said housings so as to function in both said chambers, means associated with said housings to define explosion chambers, means defining ports to afford communication between said explosion chambers and said compression chamber and between said explosion chambers and said expansion chamber, valves controlling passage through said ports, springs effective to close said valves, and means for opening the said valves at the proper times in the operating cycle, said opening means including a cam structure mounted on said casing, and valve lifters mounted on said rotor to engage the said cams.

5. A rotary internal combustion engine comprising a casing, a rotor operable therein, said rotor and casing defining an inhalation-compression chamber and an expansion-exhaust chamber, piston housings in said rotor, pistons in said housings so as to function in both said chambers, means associated with said housings to define explosion chambers, inlet valves in advance of said pistons, said inlet valves operable to afford communication between said compression chamber and said explosion chambers, and outlet valves behind said pistons, said outlet valves operable to afford communication between said explosion chambers and said expansion chamber.

6. A rotary internal combustion engine comprising a casing, a rotor operable therein, said rotor and casing defining an inhalation-compression chamber and an expansion-exhaust chamber, piston housings in said rotor, pistons in said housings so as to function in both said chambers, means associated with said housings to define explosion chambers, inlet valves in advance of said pistons, said inlet valves operable to afford communication between said compression chamber and said explosion chambers, outlet valves behind said pistons, said outlet valves operable to afford communication between said explosion chambers and said expansion chamber, and cams concentric with the axis of said rotor, said cams effective to cause the actuation of said inlet valves and said outlet valves.

7. In a rotary internal combustion engine, a rotor comprising a rim having an axis of rotation, a piston housing having transverse walls extending inwardly of said rim, other walls joining said transverse walls intermediate the rim and the said axis of rotation, means defining explosion chambers, said pistons having motion substantially along radial lines operable in said piston housing, means including walls spaced apart from said piston housing walls, means defining ports leading into and out of said explosion chambers, and valves having substantially radial motion controlling passage through said ports.

8. In a rotary internal combustion engine, a rotor comprising a rim having an axis of rotation, piston housings having transverse walls extending inwardly of said rim, other walls joining said transverse walls intermediate the rim and the axis of rotation, means defining explosion chambers, said pistons movable substantially radial in said piston housings, means including transverse walls spaced apart from said piston housing transverse walls, a chord wall joining the explosion chamber transverse walls, means defining inlets and outlets for said explosion chambers, valves controlling respectively the said inlets and outlets, said valves operably mounted in said chord wall, and means for actuating said valves due to the rotation of said rotor.

9. In a rotary internal combustion engine, a rotor comprising a rim having an axis of rotation, piston housings having transverse walls extending inwardly of said rim, other walls joining said transverse walls intermediate the rim and the axis of rotation, means defining explosion chambers, said pistons movable substantially radial in said piston housings, means including transverse walls spaced apart from said piston housing transverse walls, chord walls joining the explosion chamber transverse walls, means defining inlets and outlets for said explosion chambers, valves controlling respectively the said inlets and outlets, said valves having stems, guides in said chord walls for said stems, and cams axially disposed relative to said rotor, said cams effective to actuate said valves in timed relation to the travel of said rotor.

10. In a rotary internal combustion engine, a rotor comprising a rim having an axis of rotation, a piston housing extending inwardly of said rim, a piston movable substantially radial in said piston housing, means defining an explosion chamber around said piston housing, said explosion-chamber defining-means having a chord wall intermediate said rim and said axis of rotation, means defining explosion-chamber ports in said rim, valves for said ports, valve stems extending inwardly of said rotor, and stationary cams concentric with said axis of rotation, said cams effective to cause the actuation of said valve stems in timed relation to the travel of said rotor.

In testimony whereof, I sign my name hereto.

FREDERICK M. NEWSON.